United States Patent [19]

Winiczei

[11] 4,151,509
[45] Apr. 24, 1979

[54] NUMBER GUARD ANTI-THEFT DEVICE

[76] Inventor: John Winiczei, 117-18 238th St., Elmont, N.Y. 11003

[21] Appl. No.: 859,641

[22] Filed: Dec. 12, 1977

[51] Int. Cl.² .................. B60R 25/04; B60R 25/10
[52] U.S. Cl. ........................ 340/64; 307/10 AT;; 180/114
[58] Field of Search .............. 340/63, 64; 307/10 AT; 180/114

[56] References Cited
U.S. PATENT DOCUMENTS

| | | | |
|---|---|---|---|
| 3,543,040 | 11/1970 | Nemeth | 340/64 |
| 3,697,945 | 10/1972 | Comber | 340/64 |

Primary Examiner—Alvin H. Waring
Attorney, Agent, or Firm—Toren, McGeady and Stanger

[57] ABSTRACT

An anti-theft device employs a magnetically latched relay connected to the spark coil of a vehicle, a push-buttonswitch, and several multiposition thumbwheel switches for selectively setting the relay in positions where the spark coil is operational or inoperative and for maintaining both the operational and inoperative conditions of the spark coil without constantly drawing battery current, the initiation of the inoperative condition being achieved merely by actuating the push-button switch with the thumbwheel switches in the proper positions.

8 Claims, 4 Drawing Figures

NUMBER GUARD ANTI-THEFT DEVICE

BACKGROUND OF THE INVENTION

The invention relates generally to devices for preventing the unauthorized operation of a motor vehicle, and in particular relates to anti-theft devices that disable the ignition system of the vehicle until the vehicle operator properly selects the correct coded number on the anti-theft device.

DESCRIPTION OF THE PRIOR ART

Anti-theft devices range in complexity from very simple encoded plugs connecting the distributor terminals of an engine to the spark plugs thereof, such as is disclosed in U.S. Pat. No. 3,973,641, or key operated devices such as U.S. Pat. No. 3,820,361, to complicated combined electronic-electromechanical systems such as in U.S. Pat. No. 3,710,316. The former type generally has the advantage of requiring no additional battery current from the ignition system during their system-enabling "unlocked" condition. This becomes increasingly important during cold weather starts, when it is desired that all the available battery power be directed to the starter motor and ignition system of the vehicle. Thus, systems employing a number of solenoids, all of which draw current in the "unlocked" condition during starting of the vehicle, such as U.S. Pat. No. 3,544,804, may actually interfere with cold weather starts, depending on the ambient conditions as well as the current deliverying capacity of the battery under these conditions.

Other anti-theft devices operate on systems within a vehicle other than the ignition, such as the fuel system in U.S. Pat. No. 3,756,341, the starting motor in U.S. Pat. No. 3,851,504 or the ignition lock as in U.S. Pat. Nos. 3,755,777 and 3,618,009.

SUMMARY OF THE INVENTION

An object of this invention is to provide a simple anti-theft device capable of being easily installed in any vehicle ignition system and requiring no current when the vehicle engine is cranked for starting.

Another object of this invention is to enable the vehicle operator to "unlock" the anti-theft system by setting a proper combination, activating a push-button switch and then immediately changing the combination without relocking the system, so that the vehicle may be operated without displaying the proper "unlocking" combination.

A further object of the invention is the provision of an anti-theft device which avoids the use of an additional key and permits the use of a standard ignition key.

Another object is to warn the operator as he attempts to exit the vehicle that the anti-theft device is in the "unlocking" condition, and that he is leaving the vehicle unprotected.

These objects are achieved by using simple, readily available electrical components readily connected to the automobile electrical system without undue modification thereto. In the anti-theft apparatus, a plurality of multiposition thumbwheel switches, when set to the "unlocking" positions, provide connections to allow current in one direction to a magnetically latching relay. To "unlock" the anti-theft apparatus, a push-button switch has to be activated. When the thumbwheel switches are set to positions other than the "unlocking" positions when the push-button switch is activated, a circuit is completed through these thumbwheel switches that reverses the current through the relay, thereby "locking" the apparatus and interrupting current flow through the primary winding of the vehicle's high voltage ignition coil. A buzzer operated by the relay and connected to the door switch provides the driver with an audible warning tone indicating that he is leaving the vehicle unprotected with the anti-theft device in an "unlocked" condition.

DESCRIPTION OF THE PREFERRED EMBODIMENT

Figure 1:
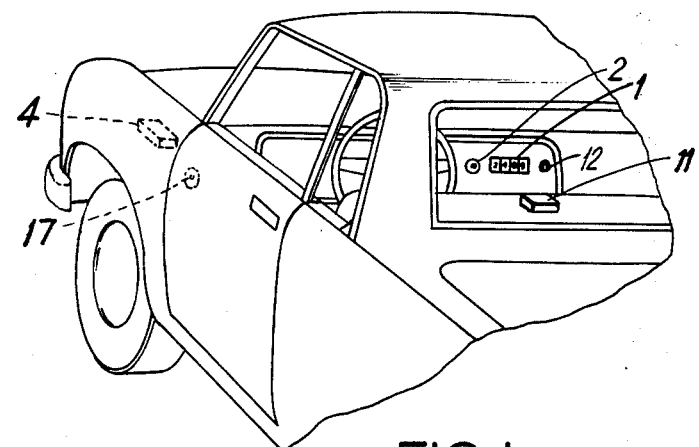
FIG. 1 is a partial perspective view of a vehicle showing the location of the different anti-theft device components.
Figure 2:
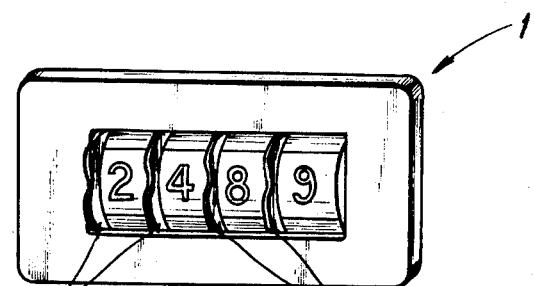
FIG. 2 is a perspective view of the thumbwheel switch panel forming part of the apparatus according to the invention.
Figure 3:
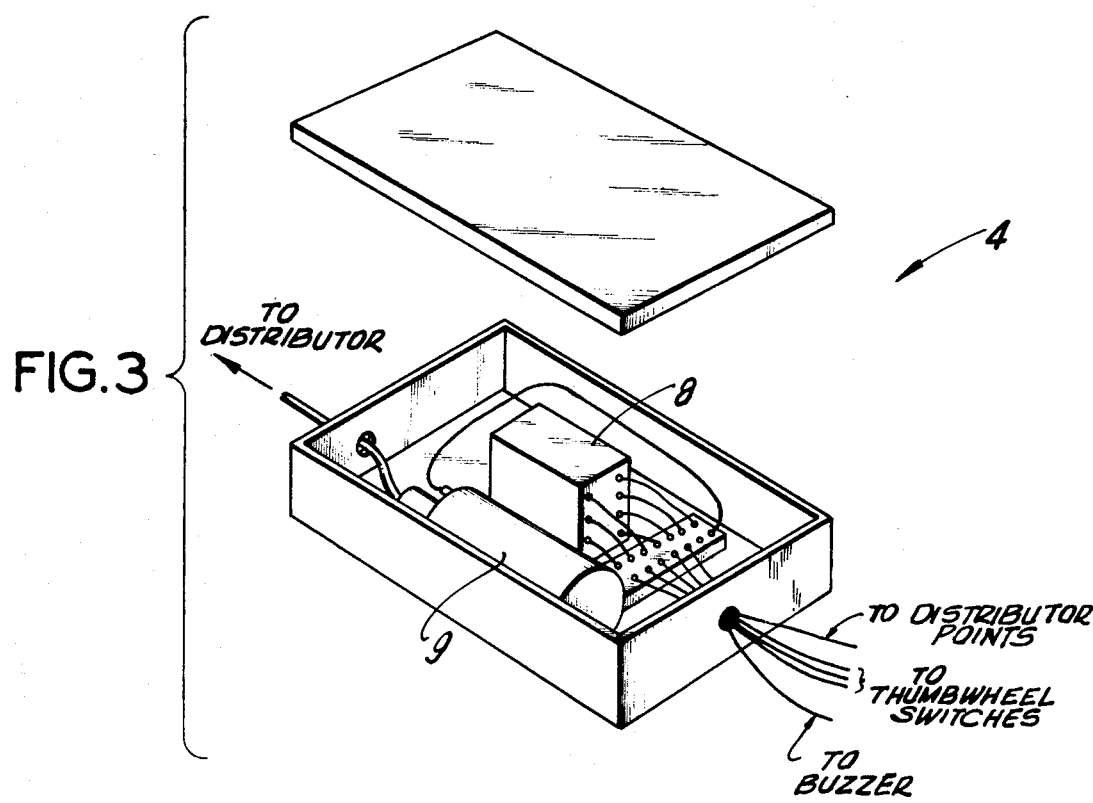
FIG. 3 is a perspective view of the tamperproof box and its contents according to the invention.

As shown in FIG. 1, a thumbwheel switch panel shown in detail in FIG. 2, is mounted on the dashboard of a vehicle and contains a number of thumbwheel switches. In order for the apparatus to operate properly, at least two such switches must be provided. It is preferable, however, to utilize three or more such switches so that the number of erroneous number combinations is increased, thereby making it difficult for an unauthorized operator of the vehicle to arrive at the proper numerical combination by chance.

Normal door switch 17 forms part of the circuit as shown. Push-button switch 2, whose function will be described below, is mounted conveniently on the dashboard of the vehicle.

In the engine compartment of the vehicle, a tamperproof box contains the high voltage coil from the normal engine ignition system, a magnetically latching relay and a terminal block.

The tamperproof box 4 may be of any known type and is constructed of heavy gauge steel. It is provided with an opening at either end for the transformer high voltage wire and the wire leading to the warning buzzer 11 mounted beneath the vehicle-board (see FIG. 1), the indicator light, the thumbwheel switches, and the distributor points of the vehicle engine. A lamp 12 mounted on the dashboard indicates to the vehicle operator that the anti-theft device is in the "unlocked" condition. This would eliminate the possibility that the anti-theft device is the cause of trouble, in the event difficulty is encountered when the driver attempts to start the engine. The dashboard mounted switch 2 has three functions. It provides a "locking" position of the magnetically latching relay, an unlocking position on the relay and a test button for the indicator light 12.

Figure 4:
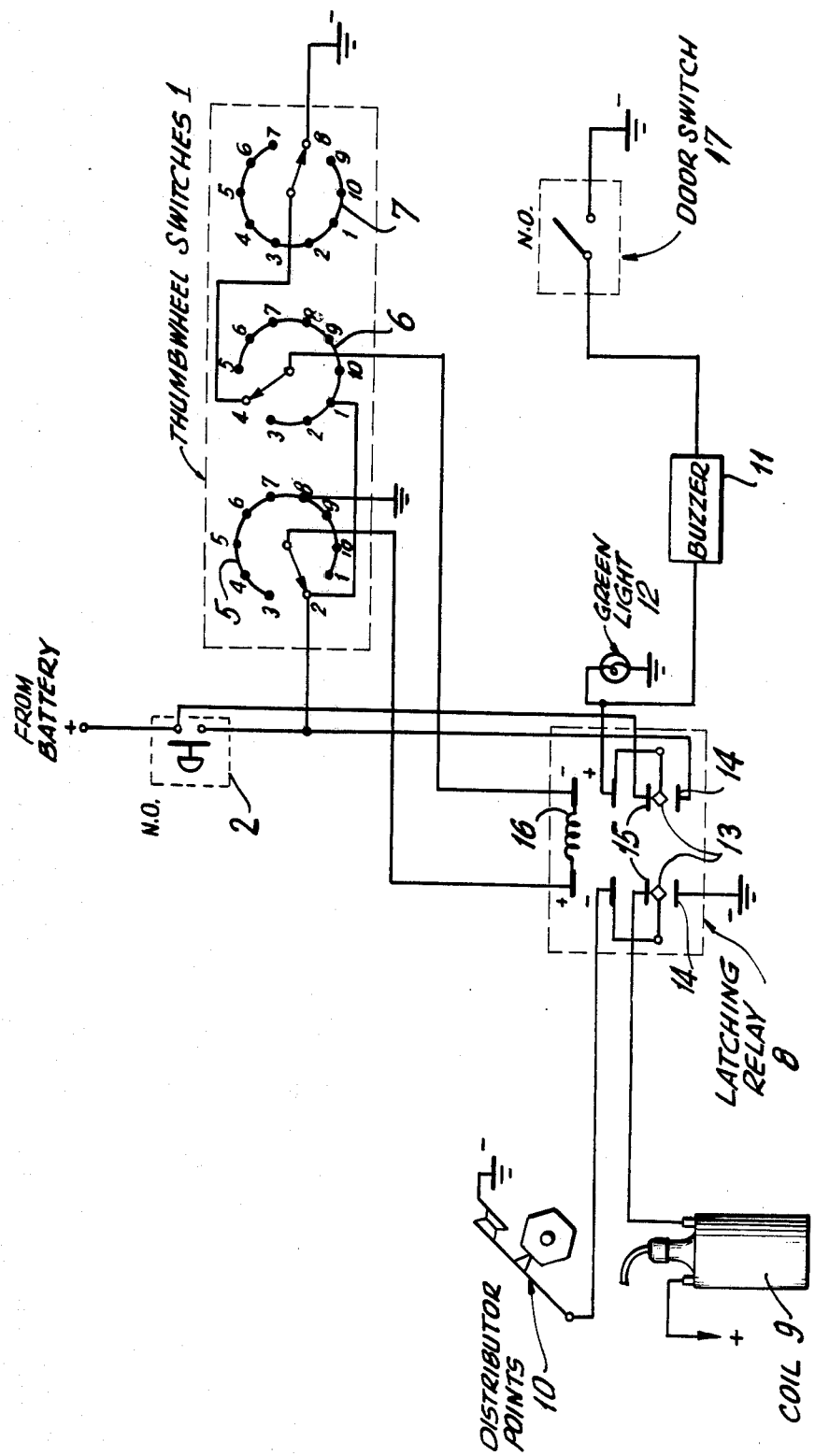
FIG. 4 is a schematic diagram of the anti-theft device circuit.

In the schematic diagram of the anti-theft device, FIG. 4, a magnetically latching relay 8 is shown in the "unlocked" position. That is, armature 13 is in a position abutting relay contacts 15. In its "locked" position, the armature 13 moves away from contacts 15 to an abutting relationship with contacts 13. Relay 8 is mechanically latched in either of the "locked" or "unlocked" positions by pure mechanical force or by permanent magnets, so that either latched condition may be maintained without any external power source. In the embodiment shown in FIG. 4, the armature is either attracted or repelled to its "locked" or "unlocked" positions depending on the direction of current flow in the relay coil 16. The left-hand set of relay contacts 14, 15 are used to either disable or render operational the automobile ignition system, while the right-hand set of relay contacts controls the indicator light 12 and the buzzer 11. Specifically, in the "unlocked" position of the relay 8 shown in FIG. 4, the primary winding of the ignition coil 9 is connected through the left-hand member of the armature 13 and the left-hand contact 15 to the distributor points, rendering the ignition system operational. In this position, the indicator light 12 and the buzzer 11 are connected to the positive terminal of the vehicle battery directly. Since the indicator light 12 is connected to ground, it will always be "on" when the anti-theft device is "unlocked". Indicator light 12 is also "on" when the push-button switch 2 is activated. The buzzer 11, on the other hand, is grounded through the door switch 17 and will therefore be energized only if the door is opened when the anti-theft device is "unlocked", thereby providing an audible tone warning the vehicle operator that he is leaving the vehicle with the anti-theft system "unlocked". Buzzer 11 is virtually identical to the type of warning devices currently used on automobiles to alert the vehicle operator that he is leaving the vehicle with the key in the ignition.

The two latched conditions of the relay may be considered its two stable states. Thus, the relay may be defined as a relay means triggerable to a first stable state by battery current in one sense and triggerable to a second stable state by battery current in an opposite sense for permitting the ignition system to operate only in the first stable state.

The relay coil 16 is connected to the terminals of the battery through multiposition thumbwheel switches 5, 6, 7 and through push-button switch 2. Each thumbwheel switch has a wiper arm mechanically rotatable by means of thumbwheels 3 (FIG. 2) to any of 10 contacts numbers 1-10. As indicated above, only two such switches are necessary for the operation of the device, additional switches being added to increase the number of erroneous combinations of numbers that an unauthorized operator of the vehicle would encounter if he attempted to start the vehicle without knowing the proper combination. The two necessary switches shown in FIG. 4 are labelled 5 and 6. In both these switches 5, 6, all but one of the 10 contacts are wired in common. The commonly wired contacts of switch 6 are connected to the one contact of switch 5 that is not wired in common, corresponding to the numeral 2 on the thumbswitch. This one contact of switch 5 that is not connected in common is also connected through push-button switch 2 to the positive terminal of the battery and to the right-hand contact 14 of relay 8. The one contact of switch 6 that is not connected in common, corresponding to the thumbwheel number 4 is connected to the negative terminal of the battery, or ground, through the wiper arm of switch 7 and the one contact of switch 7 that is not connected in common. It is noted that if only the two necessary switches 5, 6 are to be used, the contact of switch 6 corresponding to thumbwheel number 4 would be connected directly to the negative terminal of the battery, while on the other hand, if a fourth thumbwheel switch is to be actively utilized, it would be connected in series with contact 8 of switch 7 and the negative terminal of the battery through the wiper arm of this additional switch (not shown) and through one of the contacts that is not commonly connected. On the other hand, the system may use three active switches such as shown in FIG. 4 and one or more dummy switches on the switch panel 1 to add confusion to unauthorized vehicle operators.

The commonly connected contacts of switch 5 are connected to the negative terminal of the battery. The wiper arms of switches 5 and 6 are connected to opposite sides of relay coil 16.

In order to unlock the anti-theft device, the thumbwheel switches 5, 6, 7 are set to thumbwheel numbers 2, 4, 8, respectively. In this position of the switches when push-button switch 2 is activated, current flows from the positive battery terminal through the wiper arm of switch 5 to the left-hand side of relay coil 16, and from the right-hand side of coil 16 to the negative battery terminal through the wiper arms and contacts of switches 6 and 7, thereby latching relay 8 in the "unlocked" position. If switches 5 and 6 are set to any positions other than numerals 2, 4, respectively, when push-button 2 is not activated, no current will flow through coil 16. As soon as the push-button switch 2 is activated, current will flow from the positive terminal of the battery through the commonly connected contacts and wiper arm of switch 6 to the right-hand side of relay coil 16, and from the left-hand side of relay coil 16, through the wiper arm and commonly connected contacts of switch 5 to the negative side of the battery. Current flows in the opposite direction, setting relay 8 to the "locked" position, when the switches 5, 6 are set to numbers other than thumbwheel numerals 2, 4, respectively, and the push-button switch 2 is activated. The vehicle ignition system is thereby set to an operable condition in response to a setting of the multiposition switches to their correct predetermined positions. After "unlocking" the anti-theft device, the thumbwheel switches may be set to other positions. The latched relay will thereafter receive no further relay coil current in either direction and will remain latched in the unlocked position, maintaining the vehicle in an operable condition without requiring additional power from the battery. Furthermore, the vehicle may, under these conditions, be operated without displaying the number combination required for unlocking the anti-theft system. Additionally, with the thumbwheel switches set to positions other than those required for "unlocking" the system, the apparatus is prepared to be "locked" as soon as push-button switch 2 is activated.

While the foregoing description and drawings represent the preferred embodiments of the present invention, it will be obvious to those individuals of ordinary skill in the art that various changes and modifications may be made therein without departing from the true spirit and scope of the present invention.

What is claimed is:

1. An anti-theft device for a vehicle having an electrical ignition system including a battery, comprising a mechanically latchable relay means triggerable to a first stable state by battery current in one sense and triggerable to a second stable state by battery current in an opposite sense for permitting said ignition system to operate only in said first stable state; a switch means for providing a conduction path to said battery in response to activation of said switch means, and at least two multiposition switch means connected to said relay means and to said switch means for providing current from said battery to said relay means in said first sense in response to the manual setting of each of said at least two multiposition switches to a predetermined position, and for providing current from said battery to said relay means in said opposite sense in response to a concurrence of the manual setting of each of said at least two multiposition switches to positions other than said predetermined positions and the provision of a conduction path to said battery through said switch means, whereby said vehicle ignition system is set to an operable condition in response to a setting of the multiposition switches to their predetermined positions, and whereby the vehicle remains in the operable condition without drawing further battery current after the multiposition switches, having been set to their predetermined positions, are then set to other positions, and whereby the vehicle is set to an inoperable condition in response to activation of said switch after the multiposition switches have been set to positions other than the predetermined positions, said ignition system remaining in said inoperable condition without drawing further battery current after said switch is activated.

2. A device as recited in claim 1, further including a door switch means and a buzzer means connected to said door switch means and to said relay means for providing an audible tone in response to a concurrence of the conduction path through said switch means and the first stable state of the relay means.

3. A device as recited in claim 1, further comprising an indicator connected to said relay means for providing a visible indication of the operable state of the vehicle ignition system in response to the first stable state of said relay means.

4. A device as recited in claim 1, wherein said vehicle ignition system is provided with a high voltage coil having primary and secondary windings, and wherein said relay means provides a conduction path for the primary winding of said high voltage coil in response to the first stable state of said relay means and interrupts the primary winding in response to the second stable state of said relay means.

5. A device as recited in claim 4, further comprising a metal box enclosing said relay means, said multiposition switch means and said high voltage coil.

6. A device as recited in claim 1, wherein said multiposition switch means comprise a plurality of thumbwheel switches each having a first terminal corresponding to the predetermined position thereof, and each having a plurality of second terminals corresponding to the positions other than the predetermined positions, and having a wiper arm separately connectable to each of the first and second terminals, the second terminals of each thumbwheel switch being connected in common, means connecting one polarity terminal of the battery through said switch to the first terminal of the first of said thumbwheel switches and to the second terminals of a second of said thumbwheel switches, means connecting the switch means to the second terminals of said first thumbwheel switch, means connecting the first terminal of said second thumbwheel switch to an opposite polarity terminal of said battery, and means separately connecting each wiper arm of the first and second thumbwheel switches to said relay means.

7. A device as recited in claim 6, wherein said means connecting the second thumbwheel switch to the opposite polarity terminal of said battery comprises a third thumbwheel switch selectively providing a conduction path to said opposite polarity terminal of said battery through a first terminal and wiper arm of said third thumbwheel switch.

8. A device as in claim 1, wherein said switch is a momentary type switch.

* * * * *